US006970602B1

(12) United States Patent
Smith et al.

(10) Patent No.: US 6,970,602 B1
(45) Date of Patent: Nov. 29, 2005

(54) METHOD AND APPARATUS FOR TRANSCODING MULTIMEDIA USING CONTENT ANALYSIS

(75) Inventors: John R. Smith, New Hyde Park, NY (US); Rakesh Mohan, Stamford, CT (US); Chung-sheng Li, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/413,515

(22) Filed: Oct. 6, 1999

Related U.S. Application Data

(60) Provisional application No. 60/103,303, filed on Oct. 6, 1998.

(51) Int. Cl.[7] .............................................. G06K 9/36
(52) U.S. Cl. ...................................... 382/232; 382/100
(58) Field of Search ............................... 382/232, 100; 707/104.1, 513, 1, 10; 709/221, 220, 231; 370/466; 341/50; 715/716; 700/83

(56) References Cited

U.S. PATENT DOCUMENTS

| | | | | |
|---|---|---|---|---|
| 5,541,852 A | * | 7/1996 | EyuBoglu et al. | 364/514 C |
| 5,903,892 A | * | 5/1999 | Hoffert et al. | 707/10 |
| 5,940,391 A | * | 8/1999 | Malkin et al. | 370/390 |
| 5,953,506 A | * | 9/1999 | Kalra et al. | 395/200.61 |
| 6,058,122 A | * | 5/2000 | Hwang et al. | 370/522 |
| 6,058,435 A | * | 5/2000 | Sassin et al. | 709/305 |
| 6,088,803 A | * | 7/2000 | Tso et al. | 713/201 |
| 6,141,693 A | * | 10/2000 | Perlman et al. | 709/236 |
| 6,215,774 B1 | * | 4/2001 | Knauerhase et al. | 370/252 |
| 6,233,590 B1 | * | 5/2001 | Shaw et al. | 715/500 |
| 6,237,031 B1 | * | 5/2001 | Knauerhase et al. | 709/221 |
| 6,247,050 B1 | * | 6/2001 | Tso et al. | 709/224 |
| 6,259,691 B1 | * | 7/2001 | Naudus | 370/352 |
| 6,374,260 B1 | * | 4/2002 | Hoffert et al. | 707/104.1 |
| 6,415,326 B1 | * | 7/2002 | Gupta et al. | 709/231 |
| 6,529,528 B1 | * | 3/2003 | Park et al. | 370/535 |
| 6,546,555 B1 | * | 4/2003 | Hjelscold et al. | 725/1 |

FOREIGN PATENT DOCUMENTS

EP 1001582 * 5/2000 ........... H04L 29/06

OTHER PUBLICATIONS

Smith et al., "Transcoding Internet Content for Heterogeneous Client Devices", Proceedings of the 1998 IEEE International Symposium on, vol. 3, 1998, pps. 599-602.*
Smith et al., "Content-Based Transcoding of Images in the Internet", IEEE, I(mage Processing, vol. 3, 1998, pps. 7-11.*

(Continued)

*Primary Examiner*—Anh Hong Do
(74) *Attorney, Agent, or Firm*—Thu Ann Dang; Anne Vachon Dougherty

(57) ABSTRACT

A method and apparatus for selecting at least one transcoding method for manipulating multimedia data for delivery on the basis of analysis of the content of the multimedia data. Many possible transcoding operations can be performed on multimedia data to adapt it to constraints in delivery and display, processing and storage of client devices. The selection of specific transcoding operations can be made by first analyzing the features, purposes and relevances of the individual multimedia objects within the multimedia documents, then by selecting the transcoding alternatives according to the results of the analysis. Based on the analysis, different transcoding algorithms can be applied to different content, less than all of the content can be transcoded, groups of multimedia objects can be transcoded, etc.

28 Claims, 12 Drawing Sheets

OTHER PUBLICATIONS

Acharya et al., "Compressed Domain Transcoding of MPEG", IEEE, International Conferences on Multimedia Computing and Systems, Jun. 1998, pps. 3784.*

Foudriat et al., "Combining Two Media AQccess Protocols to Support Integrated Traffic on High Data Rate Netwqrks", IEEE, Oct. 1991, pps. 442-451.*

John R. Smith et al., Content-Based Transcoding of Images in the Internet, IEEE, 1998, pps. 7-11.*

John R. Smith et al., "Transcoding Internet Content for Heterogeneous Cliient Devices", IEE, 1998, pps 599-602.*

John R. Smith et al., "Multimedia Content Customization for Universal Access", SPIE, Nov. 1998, pps. 410-418.*

* cited by examiner

MODALITY

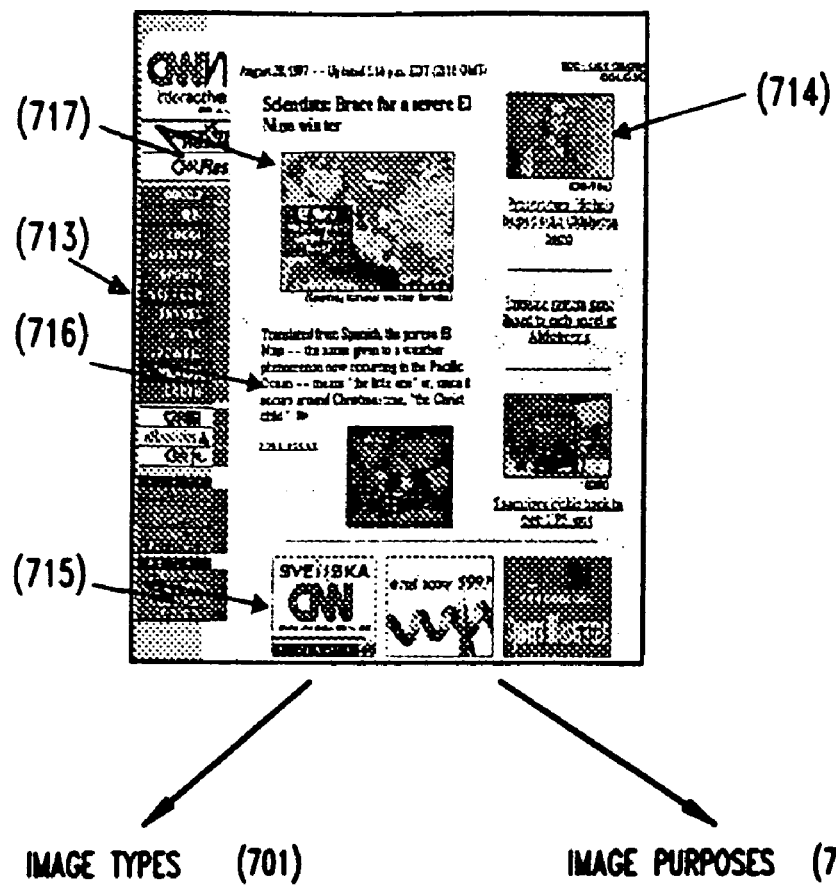
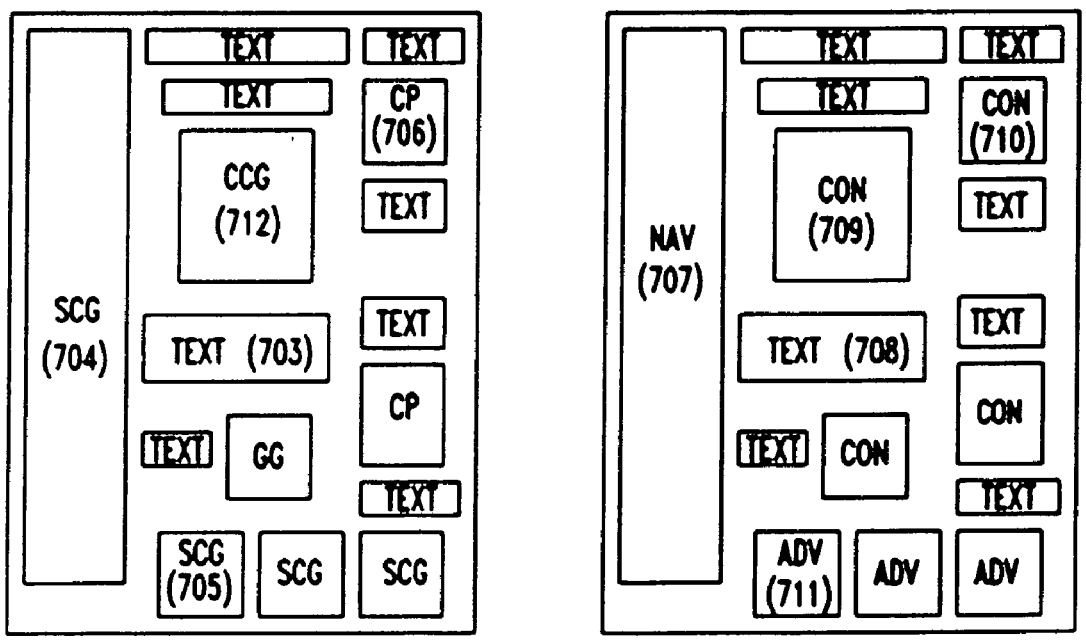
FIG. 7

| (906) Workstation | (907) Color PC | (908) TV browser | (909) HHC | (910) PDA | (911) Smart Phone |
|---|---|---|---|---|---|
| (900) | (901) | (902) | (903) | (904) | (905) "bridge" |
| size: 256 x 256 | 192 x 192 | 128 x 128 | 96 x 96 | 64 x 64 | - |
| fidelity: 38 KB | 23 KB | 8 KB | 4 KB | 0.6 KB | 100 B |
| color: 24 bit RGB | 24 bit RGB | 256 colors | 4 bit gray | B/W | - |

FIG.9

METHOD AND APPARATUS FOR TRANSCODING MULTIMEDIA USING CONTENT ANALYSIS

This application claims the benefit of Provisional Application No. 60/103,303, filed Oct. 6, 1998.

FIELD OF THE INVENTION

The present invention relates to the delivery of multimedia content and more specifically to a method and apparatus for transcoding multimedia content by analyzing the content and by transcoding the content on the basis of the results of the analysis in order to adapt the content to constraints in delivery, display, processing, and storage.

BACKGROUND OF THE INVENTION

A growing diversity of client devices are gaining access to networked servers that distribute rich multimedia content. However, the capabilities of the devices to access, process and display the content varies widely. While color workstations, which have high bandwidth network connections, can readily access and display large colorful images, many hand-held computers (HHCs), personal digital assistants (PDAs), screen phones, and smart phones can only display small images and cannot handle video. Television-based web browsers are constrained by the low-resolution interlaced display of television screens. Personal computers having color monitors often achieve low data rates along dial-up network connections, thereby inhibiting access to rich content. Given the variety of client devices, it is difficult for content publishers to anticipate and accommodate the wide spectrum of client capabilities.

Options for content adaptation include developing multiple versions of multimedia content, each suitable for a different class of client devices. Manually generating multiple versions works well if the devices can be easily aggregated into a small number of classes. Alternatively, methods can be developed that automatically generate the multiple versions of the content, such as creating a full-resolution version of the content which can be processed to generate lower resolution versions. The latter approach can be extended to allow content servers to automatically generate the appropriate version of the content at the time of request. The server can manipulate, or transcode, the existing full-resolution content, on-the-fly, to adapt it to constraints in delivery and constraints in display, processing, and storage at the client devices.

The transcoding mechanism can be deployed in a number of ways in a networked system, including deployment at a server or at the client. Alternatively, the transcoding system can be deployed at a proxy which retrieves the content from the content server, manipulates it on-the-fly, and forwards the results to the client device, as demonstrated by J. R. Smith, R. Mohan, and C.-S. Li, in an article entitled "Transcoding Internet content for heterogeneous client devices", published in *Proc. IEEE Inter. Symp. On. Circuits and Syst. (ISCAS)*, June, 1998. A proxy system can optionally cache different versions of the content to speed up the transcoded content delivery. Proxy-based transcoding systems have been developed for adapting images to client devices. Fox, et al., developed a system for compressing images that pass through the network proxy device, as detailed in "Adapting to network and client variability via on-demand dynamic distillation". published in *ASPLOS-VII*, Cambridge, Mass., October, 1996.

Other systems that compress the images using a proxy implementation to speed-up image download time (see: e.g., Intel Quick Web. Http://www.intel.com/quickweb and Spyglass Prism. Http://www.spyglass.com/products/prism.

There are many ways in which a transcoder can adapt content to the client device, such as by data compression, summarization and media conversion. Benefits can be realized by selecting the transcoding operations on the basis of the network conditions, publisher preferences, user preferences and the client device capabilities. Furthermore, additional benefits could be gained by selecting the transcoding operations on the basis of an analysis of the content as demonstrated by J. R. Smith, R. Mohan and C.-S. Li in an article entitled "Content-based transcoding of images in the Internet," published in *Proc. of IEEE Inter. Conf. On Image Processing (ICIP-98)*, Chicago, Ill., October 1998, and in an article entitled "Multimedia content customization for universal access," published in *Proc. of SPIE East-Multimedia Storage and Archiving Systems III*, Boston, Mass., November 1998.

There are many dimensions by which the content could be analyzed in order to select the transcoding operations. For example, the content analysis can ideally examine any of the following: the visual, audio, or textual characteristics of the content, such as the color information in images, the motion or scene information in video, spectral information in audio, or the occurrence of words in text passages; the purpose of the content in the larger context of a multimedia document, such as by identifying titles, headings, paragraphs, abstracts, advertisements, and inter-document links; or the importance or relevance of the content in the document or to the user, such as by identifying paragraphs related to search terms, images related to query images, or multi-media objects related to specific semantic classes.

On the basis of the content analysis, the transcoding system could then select different transcoding operations for different classes of content. For example, the transcoding system could selectively compress color and black-and-white images differently; could detect audio passages that have characteristics of speech, then convert the speech to text; could selectively remove advertisement graphics and leave other images; or could selectively and lossily compress objects within a multimedia document based on their relevance to a semantic topic or to search terms in order to conserve bandwidth. By coupling the content analysis with transcoding, the content could be better adapted to constraints in delivery, display, processing and storage.

It is, therefore, an objective of the present invention to provide a system and method for analyzing multimedia content prior to transcoding same for delivery.

It is another objective of the invention to selectively transcode multimedia content based on content analysis.

SUMMARY OF THE INVENTION

In accordance with the aforementioned and other objectives, the present invention is directed towards an apparatus and method for transcoding multimedia data on the basis of content analysis. Many possible transcoding operations can be performed on multimedia data to adapt it to constraints in delivery and display, processing and storage of client devices. The selection of specific transcoding operations can be made by first analyzing the features, purposes and relevances of the individual multimedia objects within the multimedia documents, then by selecting the transcoding alternatives according to the results of the analysis.

BRIEF DESCRIPTION OF THE DRAWINGS

The invention will hereinafter be described in greater detail with specific reference to the appended drawings wherein:

FIG. 7 shows the results of labeling images in a multimedia document into image type and purpose classes;

FIG. 9 shows examples of transcodings of an image that modify the image along the dimensions of size, fidelity and color in order to adapt them to the client devices;

DETAILED DESCRIPTION OF A PREFERRED EMBODIMENT OF THE INVENTION

Figure 1:
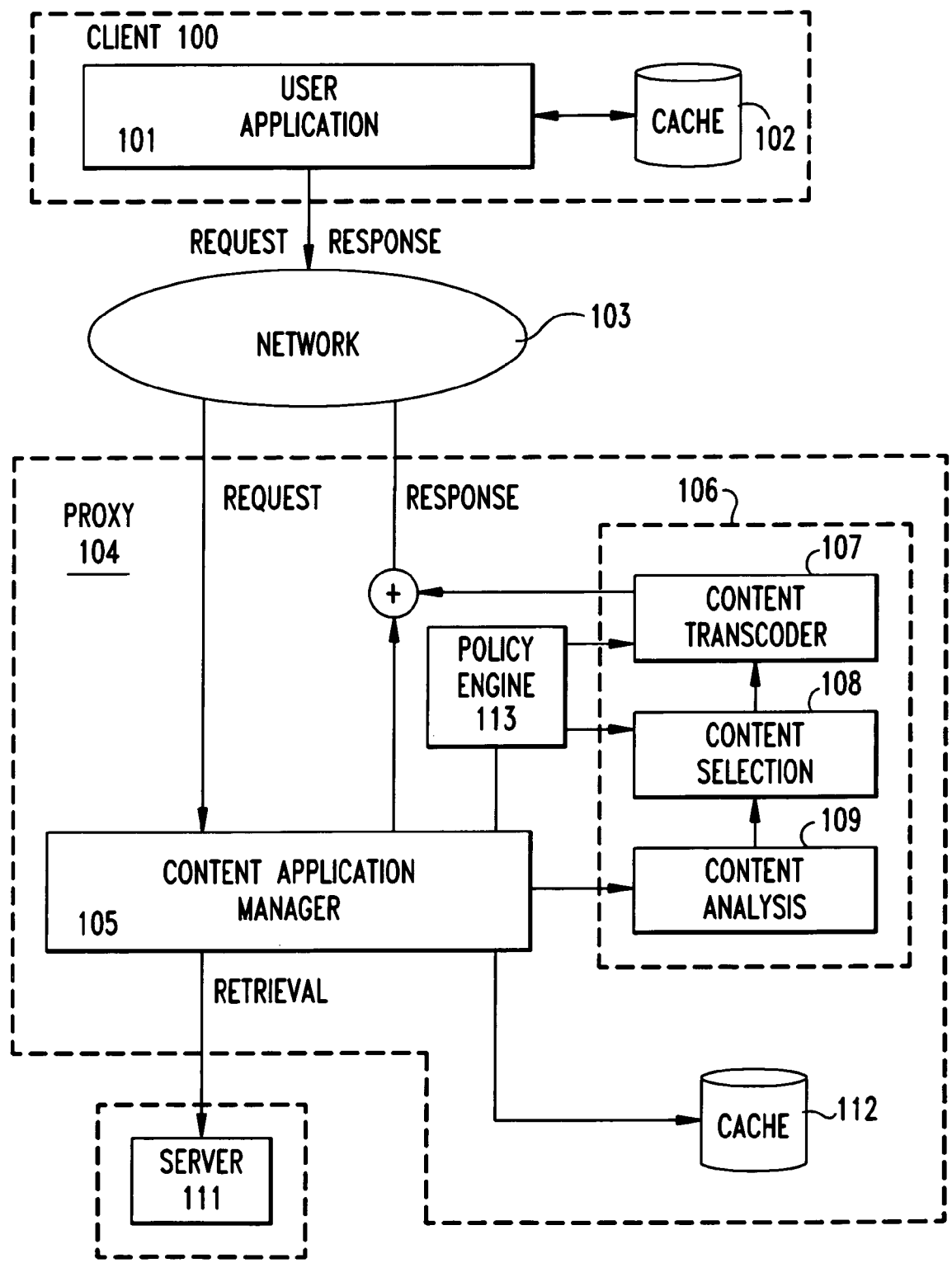
FIG. 1 shows a transcoding system that adapts multimedia content to the capabilities of client devices.

FIG. 1 depicts one example of a networked client-server system having features of the present invention. As depicted, one or more clients (100), proxies (104) and servers (111) are interconnected by a network (103). Examples of networks are local area networks (LANs) or wide area networks (WANs), e.g., an intranet, the Internet, or the World-Wide Web (WWW). A content adaptation process analyzes and transcodes content retrieved from a server (111) in order to adapt it the constraints of the client devices (100). The client device (100), running a user-application (101), accesses the content at the server (111). The user-application can make use of a local cache (102) to store and serve previously retrieved content. The user-application makes a request for content by communicating the request through a network (103) to a proxy (104). The objective of the proxy is to obtain the content and deliver it back to the user-application in a form that is suitable for the constraints of the client device (100), such as the network, display, processing and storage constraints.

The client request is communicated to a content adaptation manager (105) at the proxy. The content adaptation manager manages the processing at the proxy in order to satisfy the client's request. The content adaptation manager can check the contents of a local cache (112) to determine if the needed content has been stored locally at the proxy. Potentially, different previously transcoded versions of the content can be stored in the proxy cache. If the needed content is not stored in the cache, the content adaptation manager can issue a request to the content server (111) to retrieve the needed content. Once the content adaptation manager has obtained the content, it passes it to a transcoding system (106). According to the present invention, the transcoding system includes a content analysis subsystem (109), a content selection subsystem (108), and a content transcoder subsystem (107). As will be apparent to one having skill in the relevant art, the foregoing components are representative and may be combined or broken up into further components provided that the functionality remains.

In accordance with the inventive method, the processes running in the transcoding system determine the mismatch between the delivery, display, processing and storage requirements of the content and the constraints of the delivery system and of the client device, and then adapt the content accordingly. The content analysis subsystem (109) first analyzes the content. The content analysis can consist of many different operations including, but not limited to, classifying images into image type, purpose and semantic classes; extracting key-frames out of video sequences; extracting key-words out of text passages and speech transcripts; separating multimedia documents into multimedia objects; and separating multimedia objects into constituent modalities.

The content selection subsystem (108) selects the versions and components of the content to be transcoded (108), preferably by utilizing the results of the content analysis when making the selection. For example, the content selection process may select only the images that have been determined to be presentation content and not advertisements. The content selection process can also optimize the overall value of the content to be delivered to the client within the constraints of delivery, display, processing and storage as taught by C.-S. Li, R. Mohan, and J. R. Smith in "Method for adapting multimedia content to client devices" YOR8-1998-0647. Once the selections have been made, the content transcoder subsystem (107) can perform the transcoding of the content. The transcoding subsystem can perform operations such as: compressing images, audio, video and text; removing frames from video, or temporal segments from audio; converting text to speech; converting audio to text through speech recognition; converting text from one language to another; summarizing text passages; and so forth.

In order to perform the content selection and transcoding, the transcoding system can make use of the content analysis results. An optional policy engine (113) can employ transcoding rules that utilize the content analysis in order to perform the transcoding. For example, policies can be established to perform the following functions: compress photographs and graphics differently using the results of image type classification; remove advertisement images from multimedia documents using the results of image purpose detection; or preferentially transcode the text paragraphs related to particular semantic topics using the results of text analysis. In each of these examples, the policy engine uses the results of content analysis in order to select the appropriate transcoding operation and to select the appropriate content to be transcoded. Once the transcoding is performed, the content is returned in the response stream to the client (100) through the network. The client can optionally cache the returned content in the local cache (102). In addition, the transcoding entity (the proxy of FIG. 1) may optionally store the transcoded version in anticipation of another client request from a client having the same capabilities as the requesting client.

Figure 2:
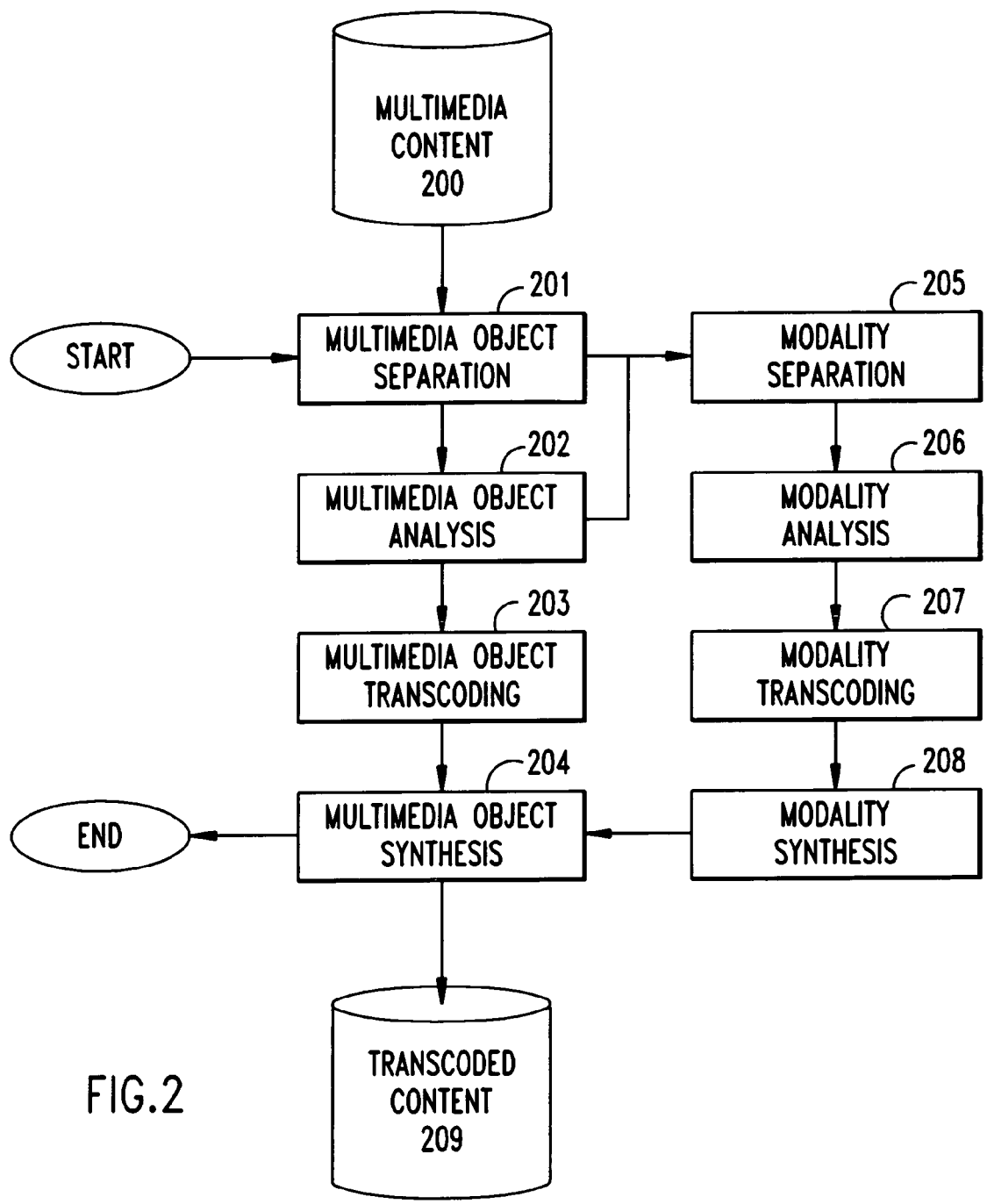
FIG. 2 shows a transcoding process by which multimedia content is broken down into individual multimedia objects and modalities that are analyzed and transcoded separately.

Referring to FIG. 2, there is shown a flow diagram which is suitable for implementing the multimedia content adaptation process (103). Upon receipt of a request, the process starts by retrieving the multimedia content from storage (200) or from a server site. The content is then separated into individual multimedia objects in step (201). The separation process may involve analysis of the multimedia material to determine file formats, MIME types, and other information that influences the separation. This processing can separate out different items in a Web document such as text bodies, Java applets, images, animations and embedded video. After multimedia object separation, the individual multimedia objects can be analyzed (202) and transcoded (203) independently, can be analyzed and grouped for transcoding, or can be further broken down into individual modalities (205).

The multimedia object analysis step (202) analyzes the multimedia objects and passes the results onto the multimedia object transcoder step (203). The transcoded multimedia objects are then synthesized together in step (204) to generate the transcoded multimedia content. In many cases, the synthesis can be done asynchronously, such as in the asynchronous loading of Web pages. In other cases, when synchronization needs to be maintained, such as for a video and its audio track, the transcoding process may need to preserve or construct the necessary synchronization information.

Alternatively, each multimedia object can be further separated into modal elements which can be performed before (not shown) or after (see: step (205)) analyzing the multimedia objects. Each individual modality, such as the text, image, video and audio of each multimedia object can be analyzed separately in step (206). The modality analysis subsystem can deploy specialized analysis algorithms for each modality. For example, photograph analysis algorithms can be utilized for visual content, and speech analysis can be utilized for audio content. The results of the analysis can then be passed onto the modality transcoding step (207) which transcodes each modality of the multimedia object. The transcoding can convert the input modality to a new modality, such as text to audio, or audio to text. Alternatively, the transcoding can summarize, compress, or elaborate on the content within the given modality of the input data, such as by image compression, or text summarization. Once the modal elements are transcoded, they can be synthesized together in step (208) to generate the transcoded multimedia objects. The transcoded multimedia objects can then be synthesized together in step (204) to generate the output transcoded multimedia content.

Figure 3:
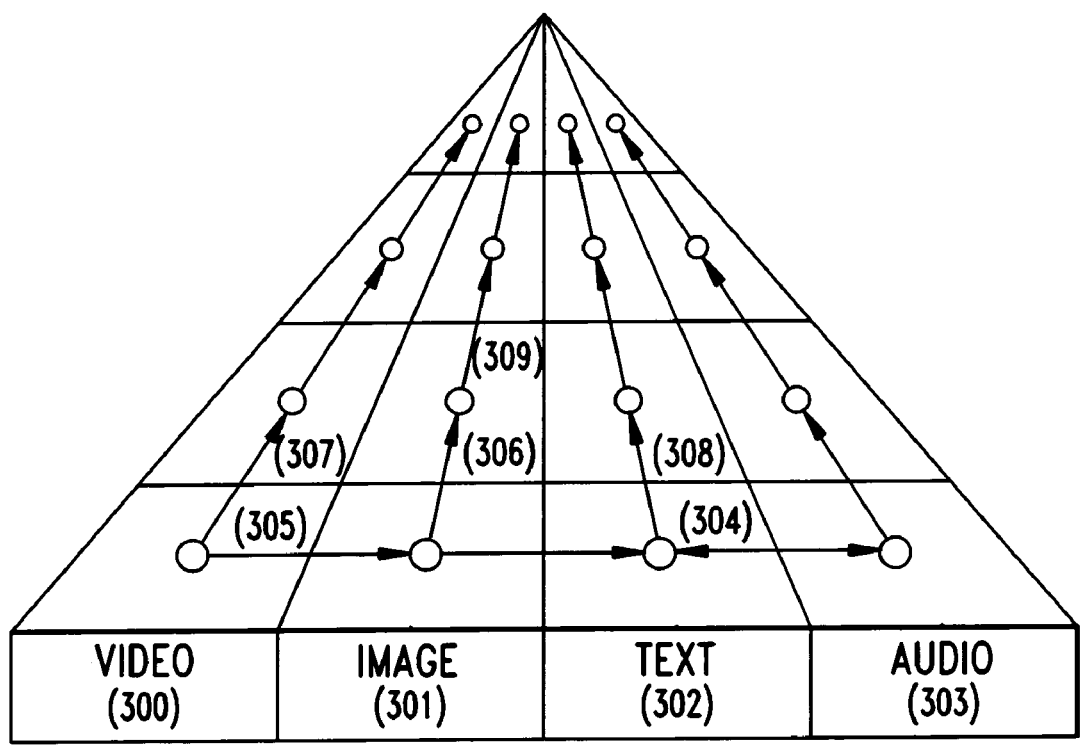
FIG. 3 shows the organization of multiple representations of multimedia objects into a pyramidal data structure.

Referring to FIG. 3, a data structure is shown in which the multiple representations of a multimedia object can be organized into a pyramidal structure. The cells of the pyramid correspond to different representations of the objects using different modalities such as video (300), image (301), audio (302) and text (303) and fidelities such as in the range of full-resolution (bottom) to low-resolution (top). A specific modal element of a multimedia object can be referred to by one of the cells.

The transcoding can be performed on the modal element by following the transcoding paths in FIG. 3 (examples are 304, 305, 306, 307, 308, 309). By following the horizontal paths (examples are 304 and 305), a modal element can be translated to a new modality. For example, text can be converted to audio in path (304). Similarly, video can be converted to images in path (305). By following the vertical paths (306, 307, 308, 309), a modal element can undergo a change in fidelity. For example, text passages can be summarized along path (308), video can be compressed along path (305), images can be compressed along path (306) and to a greater degree along path (309).

Figure 4:
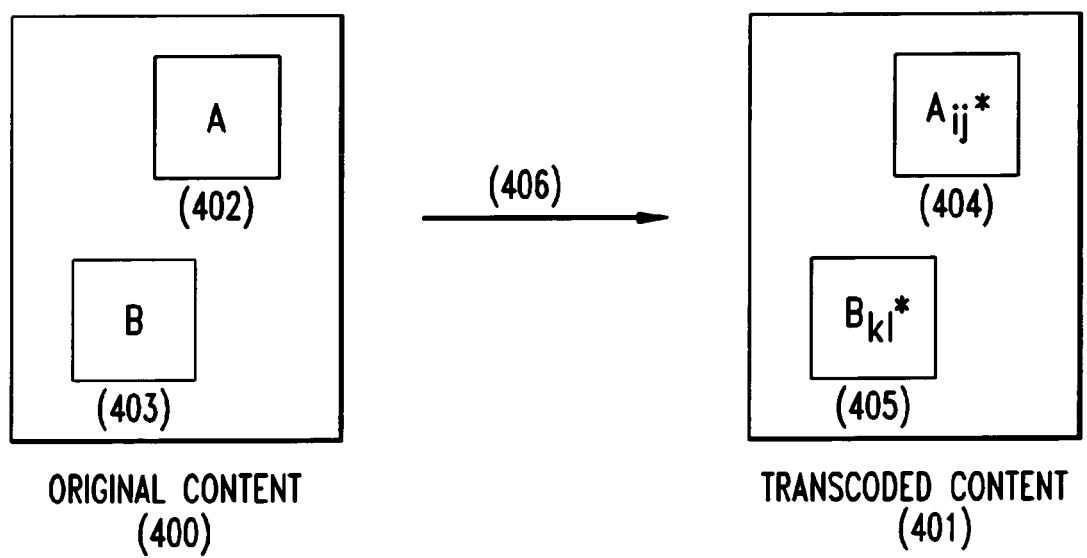
FIG. 4 shows the content selection process for transcoding a multimedia document consisting of two multimedia objects.

Referring to FIG. 4, there is shown an example of transcoding of a multimedia document (400) consisting of two multimedia objects (402 and 403) using the multiple modality and fidelity transcoding approach. The document is transcoded in step (406) by selecting a new modality and fidelity for each of the modal elements of the multimedia objects. As shown, object (402) in the original document (400) is replaced with object (404) in the transcoded document, where object (404) is represented in a particular modality (i) and fidelity (j). The modality (i) can refer to the text modality and the fidelity (j) can refer to a level of 50% summarization of the text. Likewise, object (403) in the original document (400) can be replaced with object (405) in the transcoded document, where object (405) is represented in a particular modality (k) and fidelity (l).

Figure 5:
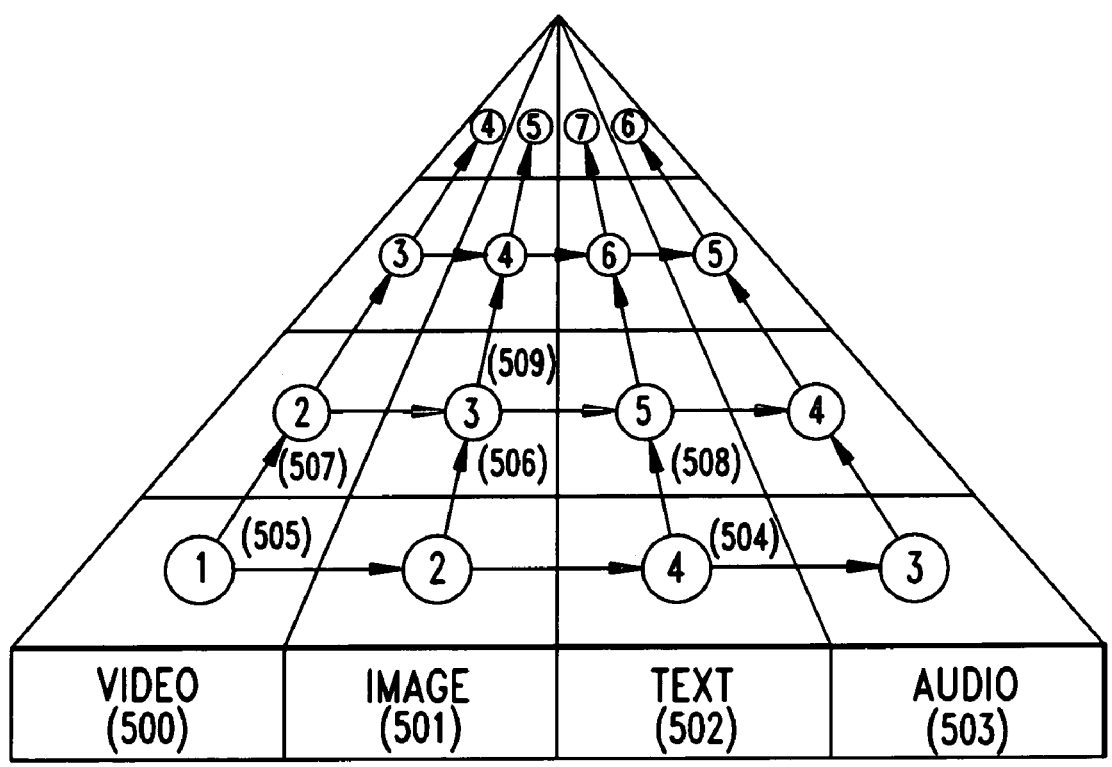
FIG. 5 shows the association of content values scores with alternative representations of a full-resolution video.

Referring to FIG. 5, there is shown an example of associating content value scores with individual modalities (video (500), image (501), text (502) and audio (503)) and fidelities of the multimedia objects. The content value scores, which can reflect the amount of information contained within the objects, can be assigned subjectively by content authors. The content value scores can be embedded in the content or stored along with it, in which case it can be communicated from the server upon request. Alternatively, the content value scores can be computed using functions such as those that depend on the entropy or some other measure of information. Given an input multimedia object such as a video (500), content value scores can be assigned to the possible representations of the video. For example, the original full resolution video (505) may be assigned with the highest content value score of "1" (505). However, the conversion of the video to an image, text (504), or audio may result in a reduction of the content value score. For example, when rendered as text, the content value score may be reduced to "4" (504). Likewise, summarization or compression (507) of the video, or summarization or compression of any of the alternative representations of the video (506, 508) using different modalities may result in a reduction of the content value score. For example, when compressed one level the content value score may be reduced to "2" (507). When the image-form of the content is compressed one level, the content value score may be reduced to "3" (506). When further compressed, the content value score may be reduced to "4" in path (509). Similarly, summarization of the text-form of the content (504) by one-level in path (508) may reduce the content value score to "5".

Figure 6:
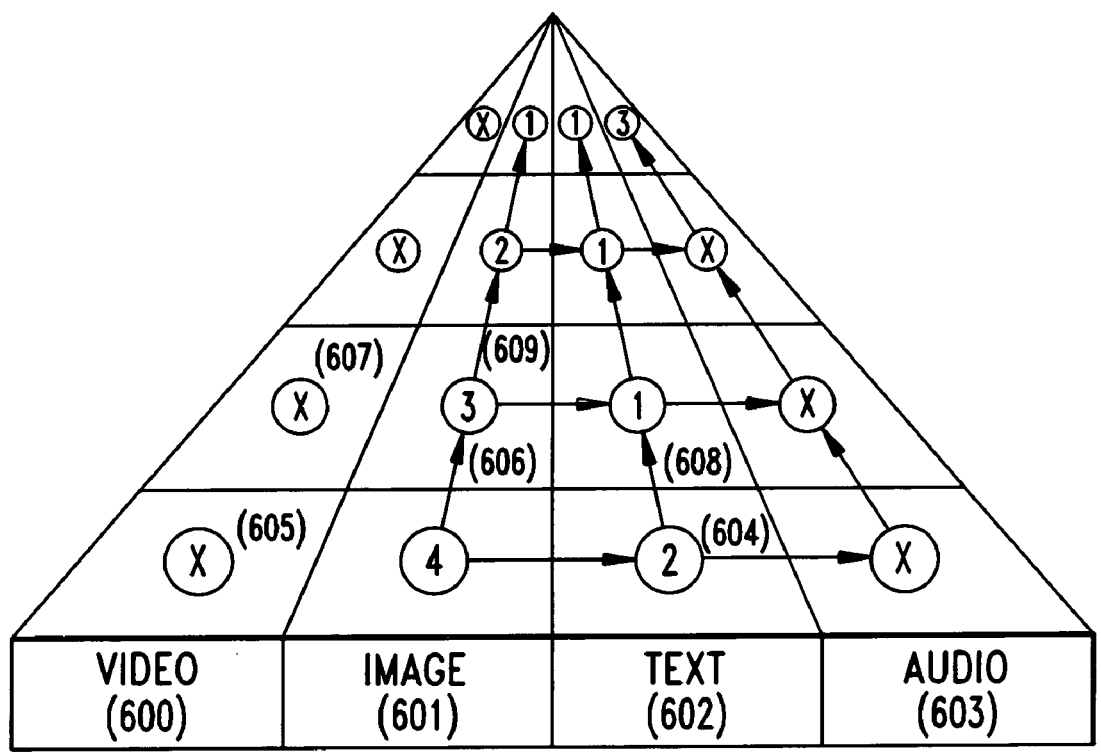
FIG. 6 shows the association of content preference scores with alternative representations of a full-resolution video.

Referring to FIG. 6, there is shown an example of associating content preference scores with the individual modalities (video (600), image (601), text (602) and audio (603)) and fidelities of the multimedia objects. The content preference scores can be assigned subjectively by users, authors or publishers of the content. Alternatively, the content preference scores can be derived from the attributes of the client devices. The transcoding system can optimize the transcoding of content by using the content value and content preference scores as taught by C.-S. Li, R Mohan, and J. R. Smith in "Method for adapting multimedia content to client devices" YOR8-1998-0647. For example, a transcoding algorithm can maximize the total content value given the constraints of the client devices, as detailed in the aforementioned Smith, et al article. Alternatively, a transcoding algorithm can maximize the total content preference given the constraints of the client devices.

The constraints of the client devices may eliminate some content alternatives. For example, a hand-held computer that cannot display video can have content value preferences that eliminate video as indicated by "X" for video in (605, 607). The device may prefer to have video delivered in the form of text and assign a high preference value of "2" to text (604). If the screen is small, the device may prefer to have the text summarized one level by assigning a higher preference of "1" to one-level lower fidelity of text (608). The device may be able to handle some images and indicate a preference level of "3" (606) for receiving video in the form of compressed images. Content preference is communiated by the client device in its initial request.

Referring to FIG. 7, there are shown the results of analyzing a multimedia document (700). In the analysis process, the document (700) can be separated into objects such as photos (714), graphics (713, 715, 717) and text (716). Each of the objects can be analyzed separately (202) as illustrated in FIG. 2, or can be broken down into further constituent modal elements, which are analyzed separately (206). The analysis process can also be designed to determine which objects are related to each other. For example, by correlating the semantic information for each object, the analysis process may determine that an image such as (717) is related to a text passage such as (716). For example, in the case of text information, this correlation can be performed by computing the similarities of term histograms for each of the objects. Once objects are determined to be related, it is possible to then transcode them as a group. For example, objects (716) and (717) can be transcoded together (i.e., removed together, compressed together) as a group. Likewise, the individual modal elements of the multimedia objects can be analyzed and transcoded as a group as illustrated in FIG. 2.

In general, many different content analysis and transcoding mechanisms are possible for multimedia documents. In particular, the benefits of using content analysis in order to perform image transcoding can be realized for many documents published on the World-Wide Web. FIG. 7 shows the results of an image analysis system that classifies the image content in multimedia documents on the Web image type (701) and purpose (702) classes. The following are examples of image type classes: T={BWG, BWP, GRG, GRP, SCG, CCG, and CP}, where BWG—b/w graphic
BWP—b/w photo
GRG—gray graphic
GRP—gray photo
SCG—simple color graphic
CCG—complex color graphic
CP—color photo The graphics vs. photographs categorization distinguishes between synthetic and natural images. In many cases, the distinction between photographs and graphics is not clear for images on the Web as detailed by V. Athitsos, M. J. Swain, and C. Frankel in an article entitled "Distinguishing photographs and graphics on the World-Wide Web" from the *Proc. IEEE Workshop on Content-based Access of Image and Video Libraries*, June, 1997. The following are examples of image purpose classes P={ADV, DEC, BUL, RUL, MAP, INF, NAV, CON}, where:

ADV—advertisement, i.e., banner ads
DEC—decoration, i.e., background textures
BUL—bullets, points, balls, dots
RUL—rules, lines, separators
MAP—maps, i.e., images with click focus
INF—information, i.e., icons, logos, mastheads
NAV—navigation, i.e., arrows
CON—content related, i.e., news photos The image type analysis can assign each image in document (700) to an image type class. For example, image (717) is determined to be a complex color graph (CCG) (712). Image (713) is determined to be a simple color graphic (SCG) (704). Image (715) is also determined to be a simple color graphic (SCG) (705). Image (714) is determined to be a color photo (CP) (706).

The image purpose analysis can assign each image in document (700) to an image purpose class based on embedded information or analysis. For example, image (717) is determined to be a content image (CON) (709). Inage (713) is determined to be a navigational (NAV) (707). Image (715) is also determined to be an advertisement (ADV) (711). Image (714) is determined to be a content image (CON) (710).

The images can also be assigned to subject classes. Example subject classes include S= {sports, weather, entertainment, news, art, architecture, music, and so forth} using the related text-to-subject mappings shown by J. R. Smith and S.-F. Chang in "Visually searching the Web for content", *IEEE Multimedia Mag.*, 4(3):12–20, July–September 1997. The semantic information can then be used in the content selection process. For example, the selection process can select only images related to "football."

Figure 8:
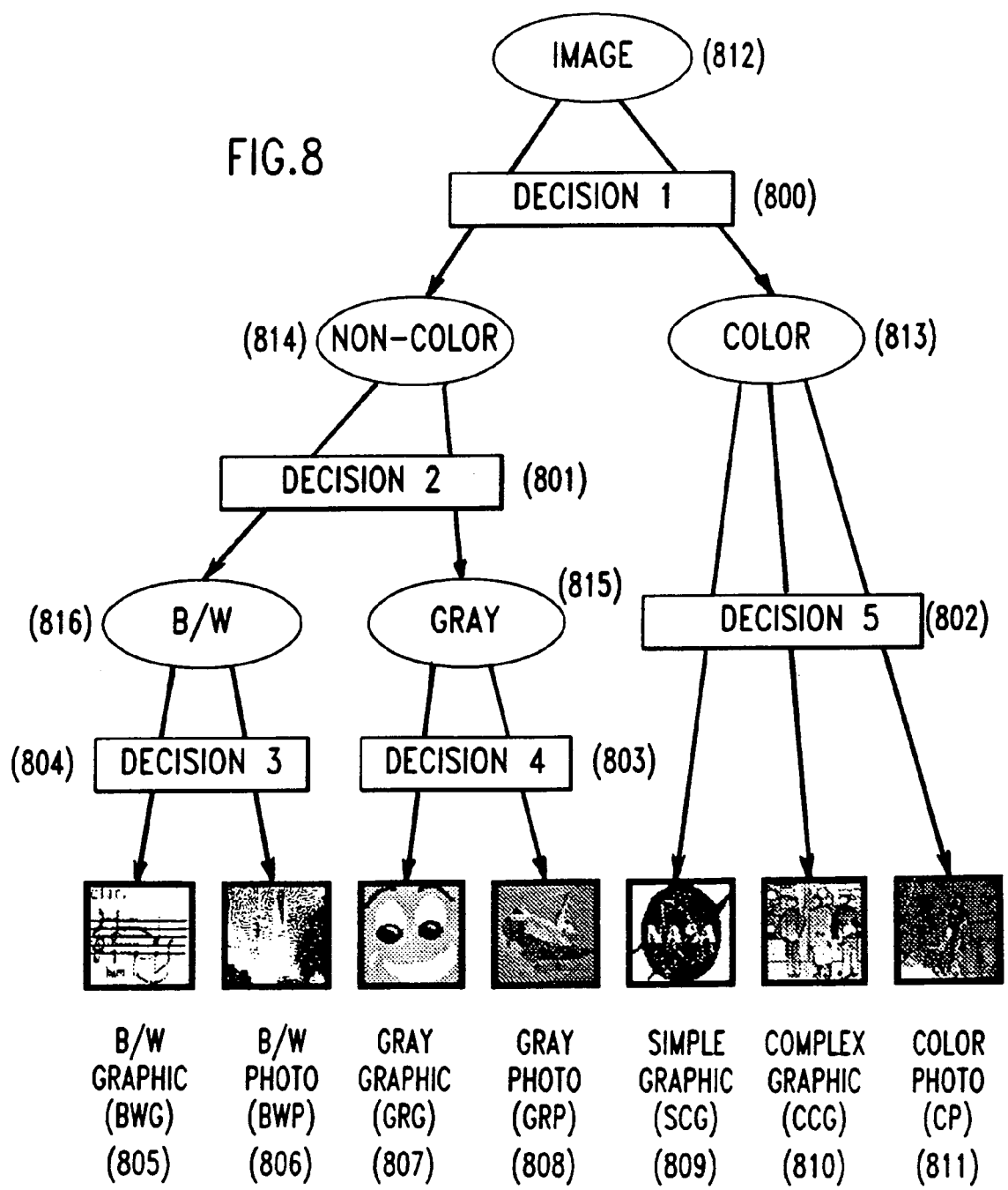
FIG. 8 shows a decision-tree for classifying images into image type classes.

Referring to FIG. 8, there is shown a decision-tree for classifying images (812) into image type classes (805, 806, 807, 808, 809, 810, 811). The decision tree classifies the images along the dimensions of color content (color (813), gray (815), b/w (816)), and source (photographs, graphics). An example of each of the seven image type classes is illustrated at the bottom of FIG. 8 (805=BWG, 806=BWP, 807=GRG, 808=GRP, 809=SCG, 810=CCG, 811=CP). The image type decision tree can use five tests (800, 801, 802, 803, 804), each of which utilizes a set of features extracted from the images. The features can be extracted only as needed for the tests in order to minimize processing. The image features can be derived from several color and texture measures computed from the images.

Each image X[m,n] has three color components, corresponding to the RGB color channels as follows: $X_{rgb}=(x_r, x_g, x_b)$, where $x_r, x_g, x_b \in \{0,255\}$. The decision tree performs the following tests for each image X:

Color vs. Non-Color.

The first test (800) distinguishes between color (813) and non-color (814) images using the measure of the mean saturation per pixel $\mu_s$. The saturation channel $\bar{\gamma}_s$ of the image is computed from X from $\gamma_s = \max(x_r, x_g, x_b) - \min(x_r, x_g, x_b)$. Then, $$\mu_s = \frac{1}{MN} \sum_{m,n} y_s[m, n]$$

gives the mean saturation, where M,N are the image width and height, respectively. Table 1 shows the mean $E(\mu_s)$ and standard deviation $\sigma(\mu_s)$ of the saturation measure for the set of 1,282 images. The mean saturation $\mu_s$ discriminates well between color and non-color images since the presence of color requires $\mu_s > 0$, while strictly non-color images have $\mu_s = 0$. However, due to noise, a small number of saturated colors often appear in non-color images. For example, for the 464 non-color images, $E(\mu_s) = 2.0$.

TABLE 1

The color vs. non-color test uses mean saturation per pixel $\mu_s$.

| Test 1 | # | E($\mu_s$) | σ($\mu_s$) |
|---|---|---|---|
| Non-color | 464 | 2 | 5.6 |
| Color | 818 | 63 | 46.2 |

B/W vs. Gray.

The second test (801) distinguishes between b/w (816) and gray (815) images using the entropy $P_v$ and variance $V_v$ of the intensity channel $\gamma_v$. The intensity channel of the image is computed as from $\gamma_v = 0.3x_y + 0.6x_g + 0.1x_b$. Then, the intensity entropy is given by $$P_v = -\sum_{k=0}^{255} p[k] \log_2 p[k],$$

where $$p[k] = \frac{1}{MN} \sum_{m,n} \begin{cases} 1 & k = y_v[m,n] \\ 0 & \text{otherwise} \end{cases}.$$

The intensity variance is given by $$V_v = \frac{1}{MN} \sum_{m,n} (y_v[m,n] - \mu_v)^2,$$

where $$\mu_v = \frac{1}{MN} \sum_{m,n} y_v[m,n].$$

Table 2 shows the statistics of $P_v$ and $V_v$ for 464 non-color images. For b/w images the expected entropy $P_v$ is low and expected variance $V_v$ is high. The reverse is true for gray images.

TABLE 2

The b/w vs. gray test uses intensity entropy $^P v$ and variance $^V v$.

| Test 2 | # | E($P_v$) | σ($P_v$) | E($V_v$) | σ($V_v$) |
|---|---|---|---|---|---|
| B/W | 300 | 1.4 | 1.1 | 11,644 | 4,993 |
| Gray | 164 | 4.8 | 2.1 | 4,196 | 2,256 |

BWG vs. BWP.

The third test (804) distinguishes between b/w graphics (805) and b/w photos (806) using the minimum of the mean number of intensity switches in horizontal and vertical scans of the image. The mean number of intensity switches in the horizontal direction $\mu_{sw}^h$ is defined by $$\mu_{sw}^h = \frac{1}{MN} \sum_{m,n} \begin{cases} 1 & y_v[m-1,n] \neq y_v[m,n] \\ 0 & \text{otherwise} \end{cases}.$$

The vertical switches $\mu_{sw}^v$ are defined similarly from the transposed image $\gamma_v^t$. Then, the intensity switch measure is given by $W_v = \min(\mu_{sw}^h, \mu_{sw}^v)$.

TABLE 3

The BWG vs. BWP test uses intensity switches $^W v$.

| Test 3 | # | E($W_v$) | σ($W_v$) |
|---|---|---|---|
| BWG | 90 | 0.09 | 0.07 |
| BWP | 210 | 0.47 | 0.14 |

GRG vs. GRP.

The fourth test (803) distinguishes between gray graphics (807) and gray photos (808) using the intensity switch measure $W_v$ and intensity entropy $P_v$. Table 3 shows the mean E($W_v$) and standard deviation σ($W_v$) of the intensity switch measure for 300 b/w and 164 gray images. The switch measure distinguishes well between b/w graphics and photos since it typically has a much lower value for b/w graphics. The gray graphics are found to have a lower switch measure and lower entropy than the gray photos.

TABLE 4

The GRG vs. GRP uses $^W v$ and intensity entropy $^P v$.

| Test 4 | # | E($W_v$) | σ($W_v$) | E($P_v$) | σ($P_v$) |
|---|---|---|---|---|---|
| GRG | 80 | 0.4 | 0.26 | 3.3 | 1.8 |
| GRP | 84 | 0.81 | 0.16 | 0.16 | 1.4 |

SCG vs. CCG vs. CP.

The fifth test (802) distinguishes between simple color graphics (809), complex color graphics (810) and color photos (811). The images are transformed to HSV and vector quantized, as described in [7]. The process generates a 166-HSV color representation of the image $\gamma_{166}$, where each pixel refers to an index in the HSV color look-up table.

TABLE 5

The SCG vs. CCG vs. CP test uses mean saturation $\mu_s$, HSV entropy $P_{166}$ and HSV switches $W_{166}$.

| Test 5 | # | E($W_v$) | σ($W_v$) | E($P_{166}$) | σ($P_{166}$) | E($W_{166}$) | σ($W_{166}$) |
|---|---|---|---|---|---|---|---|
| SCG | 492 | 69.7 | 50.8 | 2.1 | 0.8 | 0.24 | 0.16 |
| CCG | 116 | 71.2 | 46.2 | 3.1 | 1 | 0.36 | 0.16 |
| CP | 210 | 42.5 | 23.5 | 3.3 | 0.7 | 0.38 | 0.15 |

HSV switches $W_{166}$.

The test uses the 166-HSV color entropy $P_{166}$ and mean color switch per pixel $W_{166}$ measures. In the computation of the 166-HSV color entropy, p[k] gives the frequency of pixels with color index value k. The color switch measure is defined as in the test three measure, except that it is extracted from the 166-HSV color image $\gamma_{166}$. The test also uses the measure of mean saturation per pixel $\mu_s$. Table 5 shows the statistics for $\mu_s$, $P_{166}$, and $W_{166}$ for 818 color images. Color graphics have a higher expected saturation E($\mu_s$) than color photos. But, color photos and complex color graphics have higher expected entropies $E(P_{166})$ and switch measures $E(W_{166})$ in the quantized HSV color space.

Web documents often contain information related to each image that can be used to infer information about them, as detailed in the following: N. C. Rowe and B. Frew, "Finding photograph captions multimodally on the World Wide Web" from the *Technical report Code CS/Rp, Dept. Of Computer Science*, Naval Postgraduate School, 1997, and J. R. Smith and S.-F. Chang, "Visually searching the Web for content", from the *IEEE Multimedia Mag.*, 4(3):12—20, July–September, 1997. An image purpose classification system can use this information in concert with the image type information to classify the images into image purpose classes. The system can make use of five contexts for the images in the Web documents: C={BAK, INL, ISM, REF, LIN}, defined in terms of HTML code as follows:

BAK—background, i.e., <body backgr= . . . >
INL—inline, i.e., <img src= . . . >
ISM—ismap, i.e., <img src= . . . ismap>
REF—referenced, i.e., <a href= . . . >
LIN—linked, i.e., <a href= . . . ><img src= . . . ></a>

The system can also use a dictionary of terms extracted from the text related to the images. The terms are extracted from the "alt" tag text, the image URL address strings, and the text nearby the images in the Web documents. The system can make use of terms such as D={"ad", "texture", "bullet", "map", "logo", "icon"}. The system can also extracts a number of image attributes, such as image width (w), height (h), and aspect ratio (r=w/h).

The system can classify the images into the purpose classes using a rule-based decision tree framework described by S. Paek and J. R. Smith in "Detecting image purpose in World-Wide Web documents", from the *Symp. On Electronic Imaging: Science and Technology.—Document Recognition*, San Jose, Calif., January 1998. The rules map the values for image type t∈T, context c∈C, terms d∈D, and image attributes a∈{w,h,r} into the purpose classes. The following examples illustrate some examples of the image purpose rules:

p=ADV←t=SCG, c=REF, d="ad"
p=DEC←c=BAK, d="texture"
p=MAP←t=SCG, c=ISM, w>256, h>256
p=BUL←t=SCG, r>0.9, r<1.1, w<12
p=RUL←t=SCG, r>20, h<12
p=INF←t=SCG, c=INL, h<96, w<96

In order to provide feedback about the embedded images for text browsers, the system can generate image summary information. The summary information contains the assigned image type and purpose, the Web document context, and related text. The system can use an image subject classification system that maps images into subjects categories (s) using key-terms ($\bar{d}$), i.e., d→s, which is described in the aforementioned Rowe, et al article. The summary information can be made available to the transcoding engine to allow the substitution of the image with text.

The system can transcode the images using a set of transcoding policies. The policies apply the transcoding functions that are appropriate for the constraints in delivery and display, processing and storage of the client devices.

Referring to FIG. 9, the transcoding system can provide a set of transcoding functions that manipulate the images along the dimensions of image size, fidelity, and color, and that substitute the images with text or HTML code. For one, the transcoding can reduce the amount of data needed to represent the images and speed up download times. The transcoding can also reduce the size of the images in order to fit the images onto the client display screens. The transcoder can also change the storage format of the image in order to gain compatibility with the client device image handling methods. Some example transcoding functions include Size: size reduction, crop, and subsample. For example the full-resolution 256×256 image (900) can be spatially reduced to generate a smaller 192×192 image (901).

Fidelity: JPEG compress, GIF compress, quantize, reduce resolution, enhance edges, contrast stretch, histogram equalize, gamma correct, smooth, sharpen, and de-noise. For example the full-resolution image (900) can be compressed in addition to being spatially reduced (901) to further reduce the amount of data to 23 KB.

Color content: reduce color, map to color table, convert to gray, convert to b/w, threshold, and dither. For example, the 24 bit RGB color image (901) can undergo color reduction to generate an 8-bit RGB color image with only 256 colors (902). The image (902) can undergo further color reduction to generate a 4-bit gray image with only 16 levels of gray (903). The image can undergo even further color reduction to generate a 1-bit B/W image (904). The color reduction can further involve dithering to optimize the photograph quality in B/W.

Substitution: substitute attributes (a), text (d), type (t), purpose (P), and subject (s), and remove image. For example, the image (900) can be replaced with the term "bridge" (905).

Table 6 illustrates some of the variability in device bandwidth, display size, display color and storage among devices such as workstations (906), color personal computers (PCs) (907), TV-based Web browsers (908), hand-held computers (HHCs) (909), personal digital assistants (PDAs) (910) and smart phones (911).

TABLE 6

Summary of client device capabilities.

| Client device | Bandwidth (bps) | Display size | Display color | Device storage |
|---|---|---|---|---|
| PDA (910) | 14.4 K | 320 × 200 | b/w | 1 MB |
| Smart phone (911) | 14.4 K | 80 × 1 | b/w | 100 K |
| HHC (909) | 28.8 K | 640 × 480 | gray | 4 MB |
| TV browser (908) | 56 K | 544 × 384 | NTSC | 1 GB |
| Color PC (907) | 56 K | 1024 × 768 | RGB | 2–4 GB |
| Workstation (906) | 10 M | 1280 × 1024 | RGB | >4 GB |

Since many devices are constrained in their capabilities, they cannot simply access image content as-is on the Internet. For example, many PDAs (910) cannot handle JPEG images, regardless of size and can display only B/W images (904). The HHCs (909) cannot easily display Web pages loaded with images because of screen size limitations. Color PCs (907) often cannot access image content quickly over dial-up connections. The presence of fully saturated red or white images causes distortion on TV-based Web browser (902) displays. Some smart phones (911) cannot display any images but can display a small amount of text that can be delivered in place of the image. In other devices such as speech-based browsers in automotive vehicles, the text information can be rendered as speech information which can be played as audio. Other constraints of the devices such as the nature of the network connectivity can be consider. For example, devices such as hand-held computers (HHCs), personal digital assistants (PDAs), and smart phones that use wireless links may suffer from intermittent connectivity. In these cases, the transcoder can consider adding redundancy to the data to protect against data loss.

In general, the transcoder framework allows the content providers to publish content at the highest fidelity, with the system manipulating the content to adapt to the unique characteristics of the devices. The transcoding system can employ the transcoding functions in the transcoding policies. Consider the following example transcoding policies based upon image type and client device capabilities:

minify(X)←type(X)=CP, device=HHC (909)
  subsample(X)←type(X)=SCG, device=HHC (909)
  dither(X)←type(X)=CP, device=PDA (910)
  threshold(X)←type(X)=SCG, device=PDA (910)
  JPEG(X)←type(X)=GRP, bandwidth≦28.8K
  GIF(X)←type(X)=GRG, bandwidth≦28.8K Notice that two methods of image size reduction are employed: minify and subsample. The difference is that minify performs anti-aliasing filtering and subsampling. Minifying graphics often generates false colors during filtering and increases the size of the file, which can be avoided by subsampling directly. For compression, JPEG works well for gray photographs but not for graphics. For GIF, the reverse is true. When converting color images to b/w, dithering the photographs improves their appearance, while simply thresholding the graphics improves their readability. By performing the image type content analysis, the system is able to better select the appropriate transcoding functions.

The transcoding policies can also make use of the image purpose analysis. Consider the following example transcoding policies:

fullsize(X)←purpose(X)=MAP
  remove(X)←purpose(X)=ADV, bandwidth≦14.4K
  substitute(X)"<li>")←purpose(X)=BUL, device=PDA
  substitute(X,t)←purpose(X)=INF, display size=320×200

The first policy makes sure that map images are not reduced in size in order to preserve the click focus translation. The second policy illustrates the removal of advertisement images if the bandwidth is low. The third policy substitutes the bullet images with the HTML code "<li>," which draws a bullet without requiring the image. A similar policy substitutes rule images with "<hr>". The last policy substitutes the information images, i.e., logos, icons, mastheads, with related text if the device screen is small.

Figure 10:
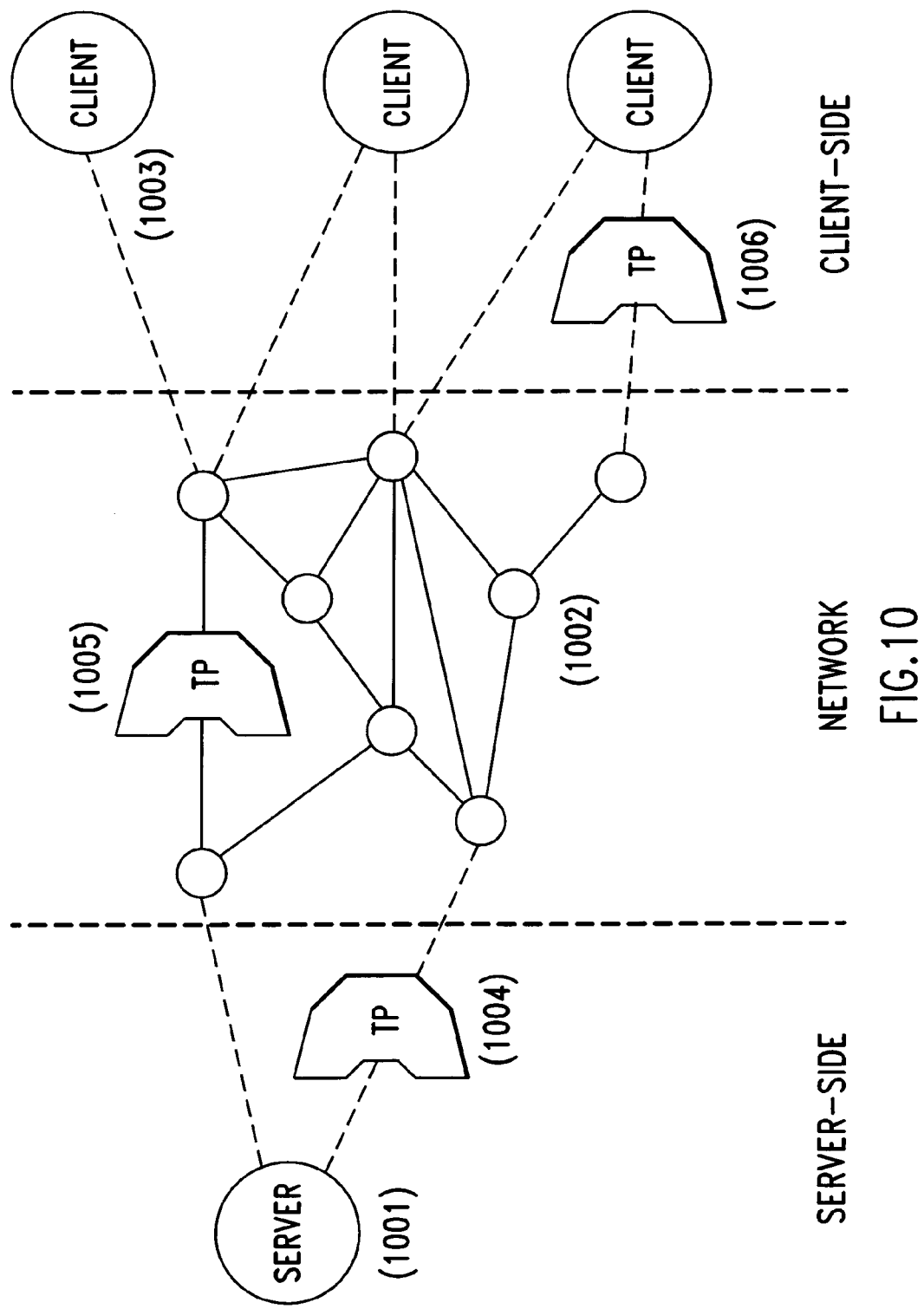
FIG. 10 shows the options for deploying a transcoder at a server, proxy or client in order to transcode multimedia documents in a networked environment.

Referring to FIG. 10, transcoding proxies (1004, 1005, 1006) can be deployed on the side of the server, in the network (1002), or on the side of the client. Deployed in the network (1005), the transcoding proxy handles the requests from the client devices (1003) for multimedia documents and images. The proxy retrieves the documents and images from the servers (1001), analyzes, manipulates and transcodes them, and delivers them to the devices (1003). Deployed at the side of the server, the transcoding proxy (1004) may have direct access to the content at the server (1001) and can transcode the content and send it to the clients (1003) through the network (1002). Deployed on the side of the clients, the transcoding proxy (1006) can perform transcoding on information retrieved by the clients (1003) from the servers (1001).

Figure 11:
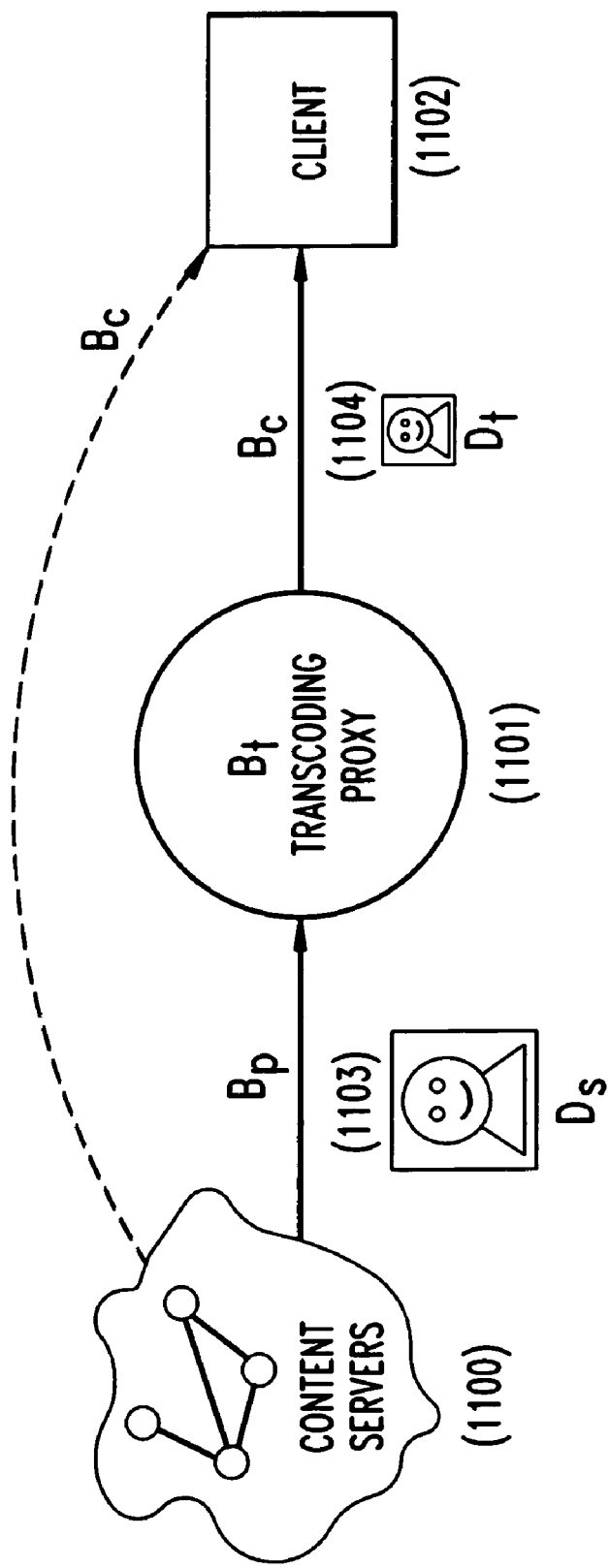
FIG. 11 shows an image transcoding proxy that analyzes and compresses images, on-the-fly, in order to adapt them to the client devices.

Referring to FIG. 11, there is shown the reduction of the data by a transcoding proxy (1101). Reducing the data sizes of the images at the transcoding proxy (1101) via image compression, size and color reduction can result in faster end-to-end delivery, even when accounting for the latencies introduced by the content analysis and transcoding. The transcoding proxy (1101) can be designed to have a relatively high bandwidth between the proxy and the content server (1100). In many cases, the proxy has a relatively low bandwidth to the client (1002).

In the transcoding proxy system, $B_p$ gives the proxy-to-server bandwidth, $B_c$ gives the client-to-proxy bandwidth, and $B_t$ gives the transcoder bandwidth. The terms $D_s$ and $D_t$ denote the data sizes of original (1103) and transcoded (1104) images, respectively. The latency in retrieving the image directly to the client is given by $L_c=D_s/B_c$. The latency in retrieving the image via the transcoding proxy is given by $L_t=D_s/B_p+D_s/B_t+D_t/B_c$. The transcoder results in a net speed-up by a factor $L_c/L_t≧1$ if the data compression ratio $D_s/D_t$ is $$\frac{D_s}{D_t} \geq \frac{B_p B_t}{B_p B_t - B_c B_t - B_p B_c}.$$

Given a relatively high proxy-to-server bandwidth of $B_p=1000$ Kbps, a client-to-proxy bandwidth of $B_c=20$ Kbps, and a transcoder bandwidth of $B_p=2400$ Kbps, a data compression ratio at the proxy of $D_s/D_t≧1.03$ results in a net end-to-end speed-up. If the data is compressed by a factor of $D_s/D_t=8$ the speed-up is by a factor of $L_c/L_t≈6.5$. If $B_p=50$ Kbps, the data compression ratio needs to be increased to $D_s/D_t≧1.8$ to have a speed-up in delivery. In this case, data compression of $D_s/D_t=8$ speeds up delivery by a factor of $L_c/L_t≈1.9$.

Figure 12:
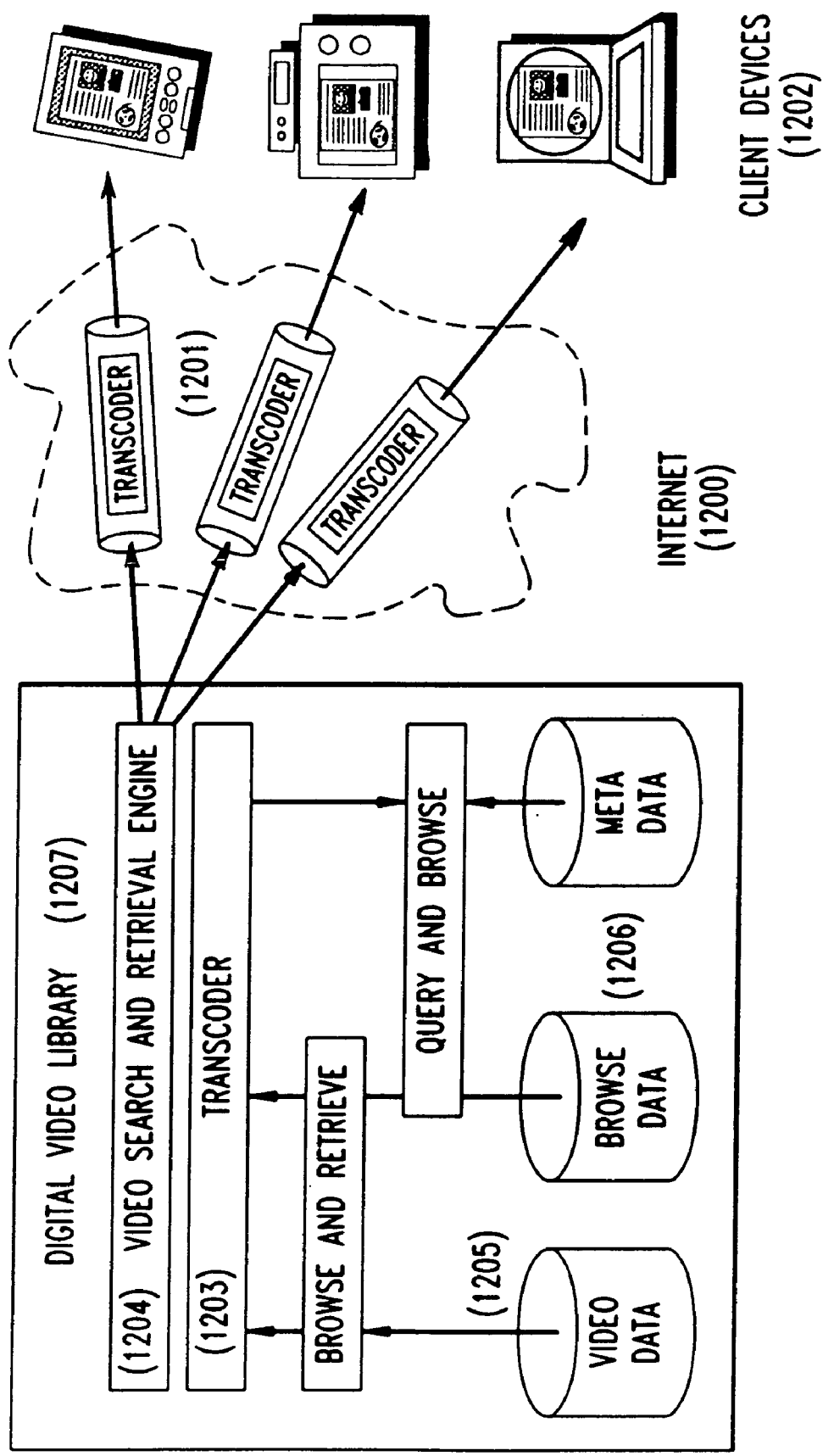
FIG. 12 shows the deployment of a video transcoding system in a digital video library to provide universal access for client devices.

Referring to FIG. 12, there is shown a video transcoding system that can be deployed as transcoding proxies (1201) in the Internet (1200), or can be deployed in the interface (1203) to a digital video library (1207). The transcoder can be used to provide universal access of the digital video library content (1205, 1206) to the client devices (1202). In many cases, the users that patronize the digital video library conduct searches of the digital video library using a video search and retrieval engine (1204). The search and retrieval engine (1204) can return browse data (1206) such as thumbnail images or animations, or video data (1205) to the user. If the user is accessing the video library via a constrained device or network connection, the video library can utilize a transcoder (1203) to adapt the content to the device constraints. For example, when the bandwidth is limited, the transcoder subsystem (1203) can transcode the content by allocating more bits of information to the items that are returned highest in the search results lists, as determined by the video search and retrieval engine (1204). Alternatively, the transcoding proxies (1201) in the network (1200) can transcode the video data (1205) and browse data (1206) to adapt it to the client devices.

The invention has been described with reference to preferred embodiments. It will be apparent that one having skill in the art could make modifications without departing from the spirit and scope of the invention as set forth in the appended claims.

What is claimed is:

1. A computerized method for transcoding a multimedia presentation for delivery and display comprising the steps of:

analyzing the content of the multimedia presentation by separating a multimedia document into individual multimedia objects; and analyzing each multimedia object individually; and performing transcoding based on said analyzing.

2. The method of claim 1 wherein said performing transcoding comprises the steps of:

selecting at least one transcoding alternative based on the results of said analyzing; and transcoding the content according to said at least one transcoding alternative.

3. The method of claim 1 wherein said performing transcoding comprises the steps of:
    selecting less than all of said content for transcoding based on said analyzing; and
    transcoding less than all of said content.

4. The method of claim 1 further comprising the steps of:
    separating the multimedia objects into individual modal elements; and
    analyzing each modal element of each multimedia object independently.

5. The method of claim 1 further comprising the steps of:
    identifying relationships between individual multimedia objects within a multimedia document; and
    transcoding related multimedia objects as a group.

6. The method of claim 4 further comprising the steps of:
    identifying relationships between individual modal elements of multimedia objects; and
    transcoding the related modal elements as a group.

7. The method of claim 1, wherein the multimedia content is a document published on the World-Wide Web.

8. The method of claim 1, wherein the multimedia content comprises visual content.

9. The method of claim 8, wherein the content analysis classifies the visual content into at least one of image type, purpose and semantic classes.

10. The method of claim 9, wherein the content analysis utilizes a decision-tree for classifying images into image type classes.

11. The method of claim 10 wherein the image type classes comprise color photos, color graphics, gray photos, gray graphics, black and white photos, and black and white graphics.

12. The method of claim 11, wherein the content analysis procedure extracts color and texture features from the images.

13. The method of claim 12, wherein image type classification is used to select from different methods for compression, size reduction, color reduction, substitution, and removal.

14. The method of claim 12, wherein image purpose classification is used to select from different methods for compression, size reduction, color reduction, substitution and removal.

15. The method of claim 1, wherein the transcoder adapts the content to the display, processing and storage constraints of the client devices.

16. The method of claim 1, wherein the transcoder adapts the content to the bandwidth and connectivity constraints of the network.

17. The method of claim 15, wherein the client device is a speech browser in an automotive vehicle.

18. The method of claim 15 wherein the client device is a hand-held computer.

19. The method of claim 15 wherein the client device is a smart phone.

20. The method of claim 16, wherein the network connection uses a wireless link to the client device.

21. The method of claim 20, wherein the client and network provides intermittent connectivity between the transcoder and client device.

22. A method as in claim 1, wherein the transcoding operation manipulates the data to generate an alternative version of it.

23. Method as in claim 1, wherein the transcoding operation selects an alternative version of data.

24. The method of claim 1, wherein the content analysis is performed off-line and the results are stored embedded in or along with the multimedia content.

25. A system for providing transcoding of the content of a multimedia presentation comprising:
    a content analysis component for analyzing the content of the multimedia presentation by separating a multimedia document into individual multimedia objects; and analyzing each multimedia object individually; and
    at least one transcoding component for performing transcoding of the content based on analyzing output provided by said content analysis component.

26. The system of claim 25 further comprising a content selection component connected to received input from the content analysis component and to select at least one transcoding option based on the input; and to instruct said at least one transcoding component to perform the at least one transcoding option.

27. A program storage device readable by machine, tangibly embodying a program of instructions executable by the machine to perform method steps for transcoding a multimedia presentation for delivery and display, said method comprising the steps of:
    analyzing the content of the multimedia presentation by separating a multimedia document into individual multimedia objects; and analyzing each multimedia object individually; and
    performing transcoding based on said analyzing.

28. The program storage device of claim 27 wherein said performing transcoding comprises the steps of:
    selecting at least one transcoding alternative based on the results of said analyzing; and
    transcoding the content according to said at least one transcoding alternative.

* * * * *